Feb. 20, 1934.  J. A. HOEGGER  1,948,112
ILLUMINATED MIRROR ATTACHMENT
Filed Dec. 22, 1931    2 Sheets-Sheet 1
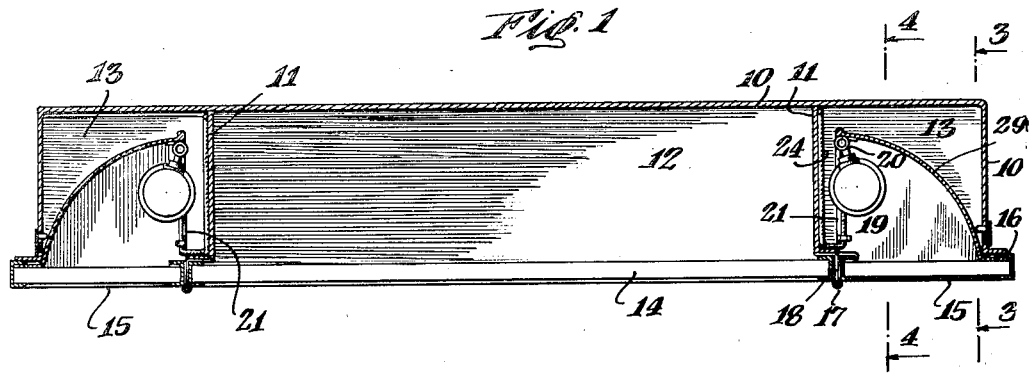
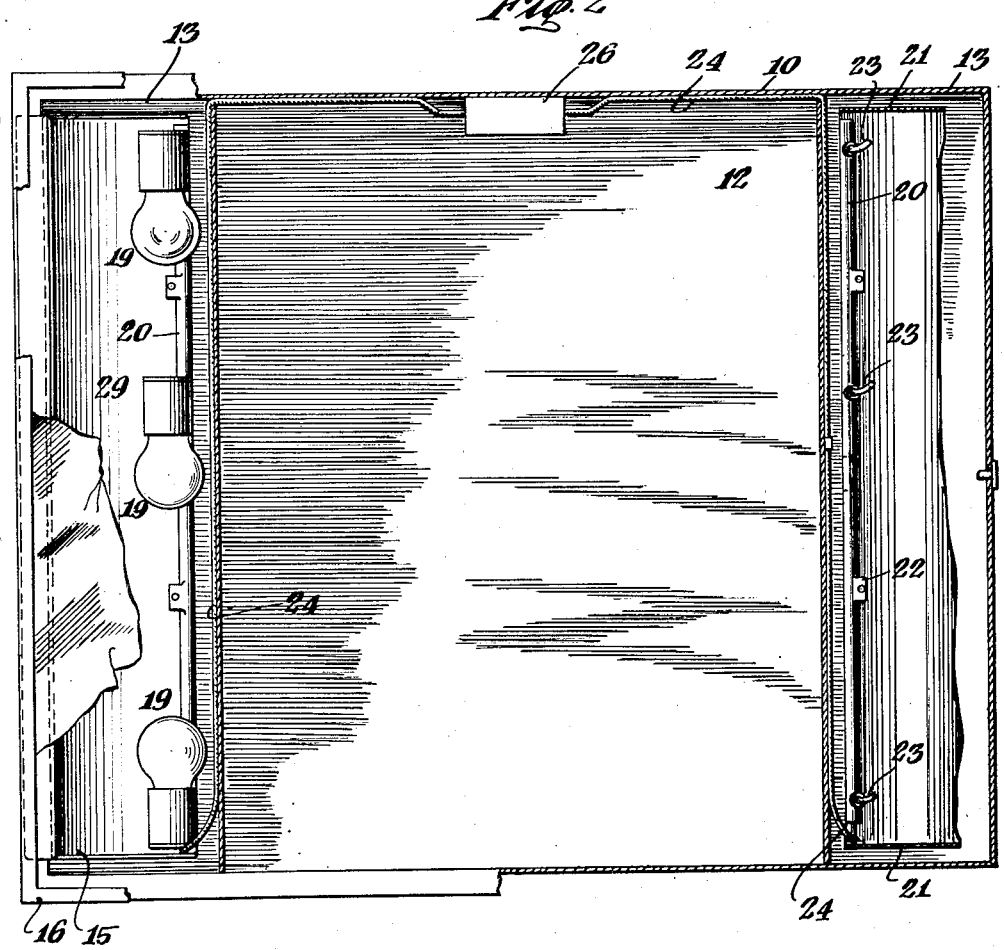
INVENTOR
Joseph A. Hoegger
BY
Hoguet & Neary
ATTORNEYS

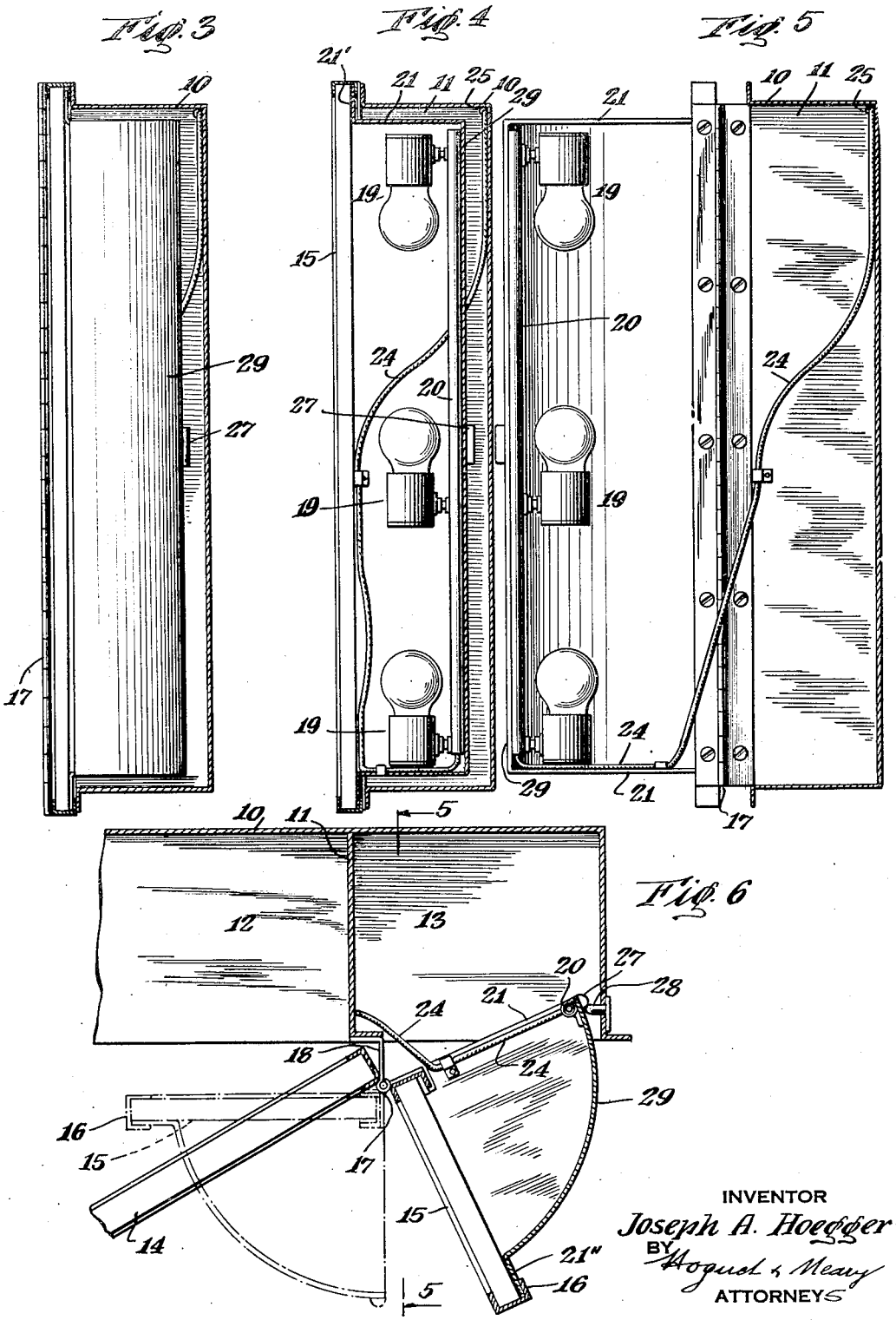

Patented Feb. 20, 1934

1,948,112

UNITED STATES PATENT OFFICE 1,948,112

ILLUMINATED MIRROR ATTACHMENT

Joseph A. Hoegger, Weehawken, N. J.

Application December 22, 1931
Serial No. 582,528

14 Claims. (Cl. 240—4.1)

My invention relates to improvements in mirror attachments and more particularly to attachments for mirrors known as wing mirrors where the main mirror which lies flat against the wall has wing mirrors at the side which swing out to give the desired refraction and lighting means. The invention, as I usually apply it, is associated with wall cabinets, and the main mirror is in the form of a door for the cabinet, while the wing mirrors are hinged at the side edges of the main mirror and close over chambers in which the illuminating means is confined, and when closed the lighting means may shine through the wing mirrors and give a very pleasing effect or when the wing mirrors are partly open the lighting means will illuminate the person or thing in front of the main mirror and give a shadowless refraction.

In the description which follows I will refer to these wing members as mirrors as that is the general term, and they may be plain mirrors or more or less frosted, but in any event they should be translucent or transparent. The particular structure of the mirror is not important, however, but it is desirable and is an object of my invention to make a simple, strong structure which will have a beautiful appearance and a most desirable effect.

It is also an object of my invention to produce a structure which when the wing mirrors are open to the desired extent will automatically close the openings behind the wing mirrors so that the effect will still be pleasing and, further, to provide means for holding the wing mirrors in a desired position, which, however, is a temporary holding means and will, when further strain is applied, permit the wing mirrors or doors to be opened wide to the end that the lighting means can be easily reached. These and other advantages will be better understood from the description which follows.

Reference is to be had to the accompanying drawings forming a part of this specification, in which similar reference characters indicate corresponding parts in all the views.

Figure 1 is a sectional plan of a wall cabinet showing my improvements;

Figure 2 is a broken front elevation thereof;

Figure 3 is a vertical section on the line 3—3 of Figure 1;

Figure 4 is a vertical section on the line 4—4 of Figure 1;

Figure 5 is a vertical section on the line 5—5 of Figure 6 with one of the wing mirror doors open; and Figure 6 is an enlarged sectional plan of a corner portion of the structure showing the action of the wing mirror and the parts which it carries.

I have shown the invention in connection with a wall cabinet 10 the body of which is substantialy conventional and which is adapted to seat in the recess of the wall; this has near the sides vertical partitions 11 thus dividing the main cabinet or box into a middle chamber 12 for ordinary cabinet purposes and chambers 13 at the sides for the illuminating means. I have shown the main chamber 12 closed by a mirror door 14 of the usual type, and when this door is closed and the doors 15 of the chamber 13 are closed the mirrors 14 and 15 will lie side by side and flat against the wall.

The description just given shows the usual and preferred application of the invention, but if the door or mirror 14 were not used to cover the cabinet but were a plain mirror, then the mirrors or doors 15 would act as herein described, but the chambers 13 would, of course, be provided in the wall.

These mirror doors 15, so-called, as stated above may be frosted mirrors or more or less transparent so that the light from behind, that is, from within the chambers 13, will shine through them. They are hinged in a common way and to this end they have frames 16 which are connected with the hinges 17, and the latter may be hinged to butts 18 which also support the hinges of the mirror door 14, but the manner of hinging is unimportant. Behind each mirror door 15 are illuminating lamps 19 which would usually be electric lamps, and these may be of any preferred type, shown one above another, and they are carried by a vertical tube 16 which receives the current cable 24, hereinafter referred to, and this arrangement makes a convenient support for the lamps, carries the cable in an unobjectionable way and serves also to stiffen the reflector 29 hereinafter more fully described.

The tube 20 is secured at the inner free edge of the curved reflector 29 and to the top and bottom parts 21 of the reflector, these being arranged with their inner edges generally radial to the axis of the door member 15 and their edges 21' can be turned so as to engage the frame of the door and be held very securely. I have shown the tube 20 provided with ears 22 to facilitate its attachment to the reflector, and in Figure 2 I have shown the connections 23 coming out through openings in the tubes, at which point sockets of the conventional kind may be provided so that the lamps 19 may be screwed to them. The connecting cable 24 is secured to the under part 21 of the reflector, is tacked up on the partition 23, extends through the hole 25 in the upper part of the partition and leads to a junction box 26 in the back of the cabinet. This is so that there shall be no slack cord acting as a drag on the reflector and the mirror door 15 when the latter is open, but, of course, the connections can be otherwise made and can be controlled by any suitable switch. The curved reflector 29 is secured to the top and bottom members 21 and has one edge formed into a flange 21'' to engage the frame 16 of the mirror door 15. At its inner or free edge the reflector is provided with an abutment 27 which, when the door and reflector are open, engages the detent 28 in the side of the chamber 13 and near the front part so as to hold the door in any desired position. By reference to Figure 6, it will be noticed that the reflector is curved to a regular arc, the radius of which is from the hinge 17 and so, when the mirror door is open to any desired extent, to get the right lighting effect the detent 28 will bear upon the reflector and hold the door which carries it in the desired position, and when it is desired to open the door wide, as shown by dotted lines in Figure 6, so that access may be had to the lamps, one simply pulls a little harder on the free edge of the door and the detent 28 is made so that it will yield sufficiently to permit the door to swing free. Either member 27 or 28 can obviously be more or less yielding and this detail in itself is well known in the mechanical arts but is believed to be new in its particular application.

It will also be noticed that when the mirror door 15 is open the reflector 29 closes the opening which would otherwise appear behind the mirror door, and thus makes the structure attractive in appearance even though the door may be partly open and to this end it is desirable to have the exterior of the reflector finished handsomely so as to make a good appearance, while the inner sides will, of course, be polished and given a surface suitable for desired refraction.

From the foregoing description it will be seen that I have produced a simple and highly ornamental structure which can be used either with or without a wall cabinet door in connection with a main mirror which can be made handsome in its appearance and effective in its illumination.

When my invention is applied to a wall cabinet I have referred to the cabinet as having separate chambers 13 at the side portions thereof, and this is desirable because the partitions 11 serve as insulators to prevent the heat from the lamps from having any injurious or undesirable effect on the contents of the cabinet, but it will be understood, of course, that these partitions may be dispensed with and the theory would not be affected.

I claim:

1. An illuminated mirror structure comprising a main mirror adapted to lie flat against a wall, lighting means, a chamber for said lighting means at the side and behind the plane of the main mirror, a swinging wing light diffusing member at the edge of the main mirror and a reflector on the back of the wing light diffusing member disposed to swing into said chamber when the wing light diffusing member is closed and to serve as a closure for said chamber when the wing light diffusing member is open.

2. A structure of the kind described comprising a main mirror adapted to lie flat against a wall, lighting means, a chamber for said lighting means at the side and behind the plane of the main mirror, a swinging wing light diffusing member at the edge of the main mirror and a curved reflector attached to the back of the wing light diffusing member near its free edge and disposed to close the opening behind the wing light diffusing member when the latter is open.

3. A structure of the kind described comprising a main mirror adapted to lie flat against a wall, a chamber for lighting means at the side and behind the plane of the main mirror, a swinging wing light diffusing member at the edge of the main mirror, a reflector on the back of the wing light diffusing member disposed to swing in and out of said chamber with the opening and closing of the wing light diffusing member, and lighting means carried by the reflector.

4. The combination with the main mirror of a swinging wing light diffusing member at the edge of the main mirror, a chamber behind the wing light diffusing member to hold lighting means, a reflector carried on the back of the wing light diffusing member and extending into the aforesaid chamber, a conduit tube vertically arranged on the reflector, carrying sockets adapted to carry lamps.

5. In a structure of the kind described, the combination with a wall having a chamber therein, of a door-like light diffusing member swinging before and adapted to close said chamber, lighting means in the chamber, a curved reflector carried by the swinging light diffusing member, and means engaging the reflector and acting to temporarily fix the partly open position of the light diffusing member.

6. In a structure of the kind described the combination with a wall and a chamber for lighting means therein, of a swinging door-like light diffusing member adapted to close the front of said chamber, a reflector carried by the light diffusing member and acting to close the opening behind it when the door is partly open, and means engaging said reflector and acting to fix the partly open position of the door, said means being releasable by additional opening strain applied to the light diffusing member.

7. The combination with the wall chamber and the swinging door-like light diffusing member for closing it, of a reflector on the back of the door disposed to close the opening to the chamber when the door is partly open, means engaging said reflector to fix the partly opened position of the door, and lighting means carried by the reflector.

8. A structure of the kind described comprising a wall cabinet, a main mirror door for the middle portion of the cabinet, swinging door-like light diffusing members at the edges of the cabinet, lighting means behind said door-like light diffusing members in the side edge portions of the cabinet, and reflectors carried by the doors and disposed so as to close the openings behind the door-like light diffusing members when the latter are partially open.

9. A structure of the kind described comprising a wall cabinet adapted to seat in a recess of a wall, a main mirror door for the body portion of the cabinet, vertical partitions in the cabinet forming side chambers for lighting means, swinging door-like light diffusing members closing said chambers, reflectors carried by the light diffusing members and disposed to partly close the openings behind them when the light diffusing members are open, and lighting means carried by the reflectors.

10. An illuminated mirror structure comprising a main mirror adapted to lie substantially flat in relation to a wall, lighting fixtures, a chamber for said lighting fixtures at the side of said mirror and behind the plane thereof, a swinging door-like light diffusing member in close proximity to and hinged at the edge of said main mirror, and a reflector on the back of said swinging light diffusing member disposed to swing in and out of said chamber.

11. A wall cabinet comprising a main chamber, a main mirrored door adapted to cover said main chamber, side chambers positioned adjacent each side of said main chamber and behind the plane of said main mirror, swinging wing door-like light diffusing members pivoting adjacent the side edges of said main chamber and at the side edges of said main mirrored door, said light diffusing members adapted to cover said side chambers, reflectors attached to the back of said light diffusing members disposed to swing in and out of said chambers in the opening and closing of the light diffusing members, and lighting means within said side chambers.

12. A wall cabinet comprising a main chamber, a main mirrored door adapted to cover said main chamber, side chambers positioned adjacent each side of said main chamber and behind the plane of said main mirror, swinging wing door-like light diffusing members pivoting adjacent the side edges of said main chamber and at the side edges of said main mirrored door, said light diffusing members adapted to cover said side chambers, lighting means within said side chambers, and reflectors positioned within said chambers adapted to direct the light through said light diffusing members.

13. An illuminated mirror structure comprising a main mirror adapted to lie substantially flat in relation to a wall, a swinging wing door-like light diffusing member pivoting at an edge of said main mirror and adapted to be positioned in the plane of said main mirror, lighting means positioned behind the said door-like light diffusing member and positioned behind the plane of said main mirror, and a reflector positioned behind said light diffusing member and adapted to direct the light therethrough.

14. A device of the kind described comprising a mirror, a pair of casings, means for hingedly mounting said casings in opposed relationship at opposite edges of said mirror, each casing having an exposed light diffusing surface extending outwardly from its hinged edge, each light diffusing surface arranged in close proximity to said mirror and extending along at least a major portion of the proximate edge thereof, each light diffusing surface being at least partially pervious to light, lighting means arranged in the rear of each light diffusing surface, and recesses at the sides of said mirror adapted to receive said casings.

JOSEPH A. HOEGGER.